E. W. LADD.
BEATER.
APPLICATION FILED AUG. 14, 1914.

1,165,423.

Patented Dec. 28, 1915.

Witnesses:
Charles Roberts

Inventor
Earnest W. Ladd.
By his Attorney

UNITED STATES PATENT OFFICE.

EARNEST W. LADD, OF NEW YORK, N. Y., ASSIGNOR TO FENTON F. CRAFT, OF NEW YORK, N. Y.

BEATER.

1,165,423.    Specification of Letters Patent.    Patented Dec. 28, 1915.

Application filed August 14, 1914. Serial No. 856,720.

*To all whom it may concern:*

Be it known that I, EARNEST W. LADD, a citizen of the United States, residing in the borough of Manhattan, city, county, and State of New York, have invented certain new and useful Improvements in Beaters, of which the following is a specification, reference being had to the accompanying drawings.

The invention relates to beating, mixing and aerating devices employing reversible rotating or interlacing floats or beating blades.

The object of my invention is to provide a beater having operating gear wheels of such structure and adjustment as will secure relatively great strength, reliable action, simple construction and low cost of manufacture.

With these principal features in view, my invention consists of the novel and practicable construction and combination of parts as herein set forth and illustrated.

Figure 1:
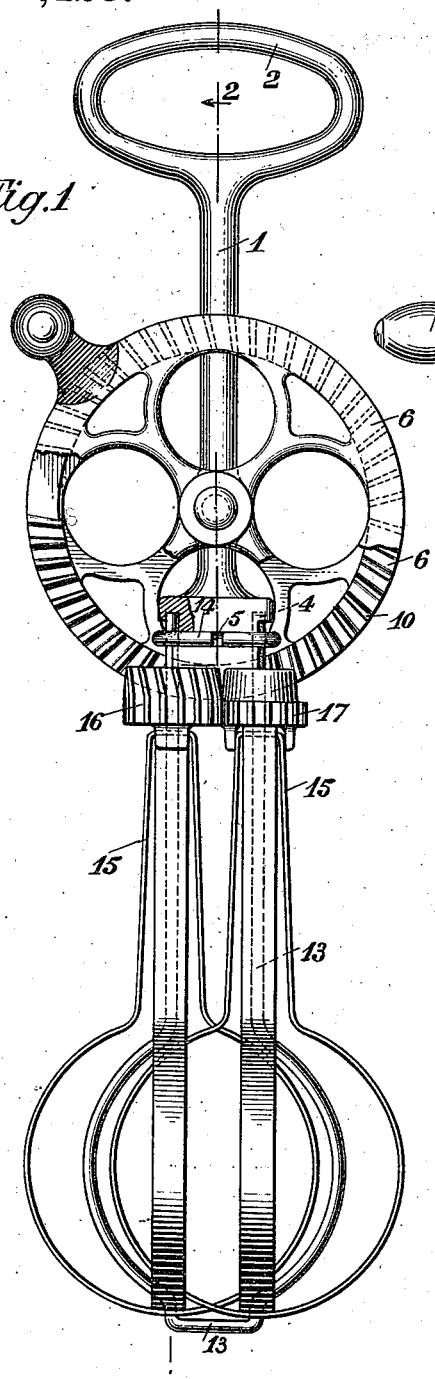
Figure 2:
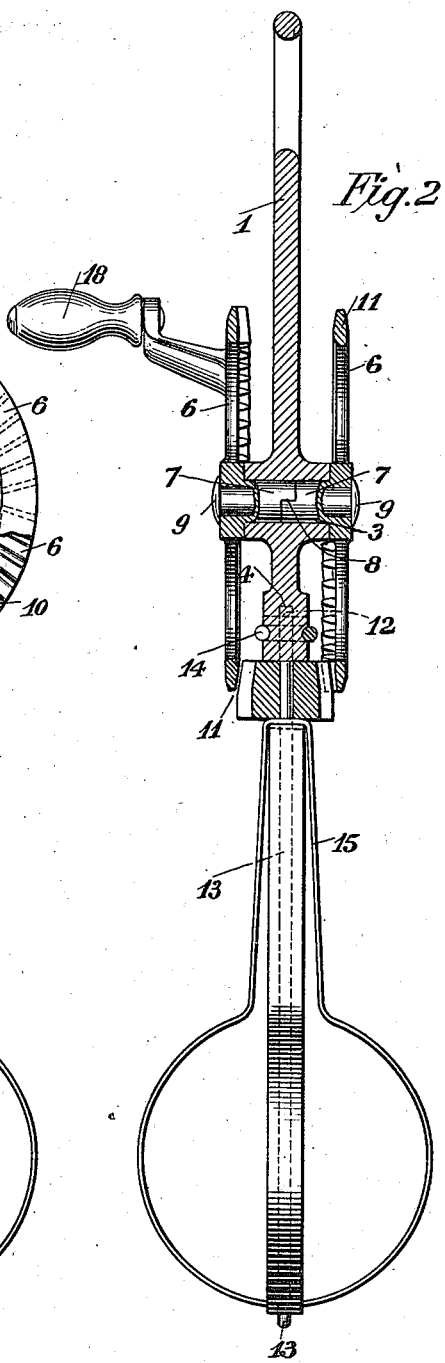

Referring to the drawings, Figure 1 is a vertical side view of a beater embodying my invention, the nearer drive wheel of which is partly broken away; and Fig. 2 is a cross section of same on the line 2—2 of Fig. 1, a part of the bearing sleeve of the dual drive wheels being broken away.

Referring now in detail to the drawings; 1 represents a supporting frame the upper part 2 of which constitutes the usual handle. In this supporting frame I have also provided a bearing 3, float support recesses 4, and a retaining groove 5 for receiving the attaching strap or split ring 14. Mounted on this supporting frame 1 are dual driving wheels 6, which preferably have integrally connected therewith the sleeve bearings 7, which bearings are stepped at 8 for the purpose of keeping the dual wheels in accurate relation to each other, these sleeve bearings 7 being inserted in the bearing 3 of the supporting frame. A rivet or bolt 9 for the purpose of rigidly uniting the dual drive wheels 6 is inserted through said bearings or sleeves and fastened in any convenient way.

The dual driving wheels 6 are provided with cogs 10, extending approximately half way around their circumference as shown, and are disposed with reference to each other so that the cogs on the sector of one wheel will lie opposite the plain surface 11 of the opposite wheel. These cogs are preferably arranged on the bias rather than pointing to a common center for the purpose of more accurate engagement with the cogs of the pinion 16 which as shown is so disposed that its cogs do not point to the center of said drive wheels. It is obvious that the cogs of pinion 16 may be made upon a bias and the cogs of the drive wheels centrally disposed, thus permitting similar accurate engagement.

It is preferable that the inside surface of the plain portion of the drive wheels be raised or thickened to such an extent as will make such plain portion of said drive wheels approximately in contact with the opposite side of pinion 16 as shown at 11, thus operating as a guide or support to said drive wheels and making their cog engagement with pinion 16 positive and reliable, and avoiding the slipping and disengagement of these cogs which is usual with other beaters; and additionally this positive and reliable cog engagement makes accurate and expensive axial adjustment of the drive wheels unnecessary.

Inserted in the recesses 4 of the support 1 are the ends 12 of the float support 13. A strap or split ring or link 14 is provided to lie in the groove 5 and hold the ends 12 of the float support 13, in rigid relation to the supporting frame 1.

On the float support 13, at the head of float 15, I have provided pinions 16 and 17, one of which is connected to each of the upright portions of the float or beater blades. The cogs on the lower part of the pinion 16 are adapted to intermesh with the pinion 17, and the cogs of the upper part of the pinion 16 are disposed to intermesh the cogs 10 of the dual driving wheels 6. The upper part of the pinion 17 is cut away for the purpose of escaping engagement or interference with the cogs 10 of the drive wheels. These pinions, 16 and 17, are reversibly rotatably mounted with reference to the float support.

Rigidly attached to the lower ends of the pinions 16 and 17, are floats or beater blades 15, the other ends of which are reversibly rotatably mounted upon the lower portions of the float support.

Having now described my invention, the operation of the same is as follows, namely: The crank 18 is manually operated in a continuous circular direction carrying with it the dual driving wheels 6, the cogs 10 of each wheel alternately engaging with the upper portion of the pinion 16 at opposite sides thereof. These cogs 10 of the driving wheels first engage one side of pinion 16, and then engage the other side of said pinion, the result of which is that the pinion 16 is given a reversibly rotating movement. The floats 15 being rigidly attached to the pinions 16 and 17, the same will be carried therewith. It will therefore be seen that upon the continuous revolution of the dual driving wheels, the floats, or beater blades, will be given a reversible rotating motion.

While I have described and shown an egg beater, it will be readily seen that this device may be used for beating, mixing and aerating purposes generally. I have described my preferable method of practising my invention but do not wish to be limited to the description given and illustrated.

What I claim as new, and what I desire to cover by these Letters Patent, is set forth in the appended claims.

1. In a beater, a supporting frame, dual driving wheels mounted on said frame, each of said driving wheels having cogs on approximately one-half of its engaging surface and a plain elevated surface on the other approximate half thereof, said cogs on each driving wheel being disposed opposite to the plain surface of the other drive wheel, a pinion eccentrically disposed to and adapted to engage with the cogs of said driving wheels, and a second pinion intermeshing with said pinion but disposed out of engagement with the said driving wheels, beater blades or members attached to said pinions, and means for supporting said beating members.

2. In a beater, a driving wheel having cogs extending around approximately one-half thereof and a plain surface extending around the balance thereof, said plain surface being elevated or thickened.

3. In a beater, dual drive wheels having cogs approximately one-half of their rim portion and plain surfaces for the balance of said rim portion thereof, said wheels being disposed opposite each other so that the cogs on one wheel will be opposite the plain surface of the other wheel; a pinion eccentrically disposed to and adapted to be alternately engaged with the cogs of each of said driving wheels, an intermeshing pinion adapted to engage with the first named pinion but so constructed that it will not engage the cogs of said drive wheels, said pinions being mounted in a plane within said driving wheels.

4. In a beater, dual drive wheels, approximately one-half of the rim portion of each of said drive wheels bearing cogs, and the balance thereof having plain surfaces, said wheels being so disposed to each other that the cog surface of one wheel will lie opposite to the plain surface of the other wheel, a pinion eccentrically disposed to and adapted to engage with the cogs of the drive wheels and a second pinion adapted to engage with the first said pinion, said second pinion being so constructed as not to engage with the said drive wheels, and said pinions being so disposed as to lie in a plane between said drive wheels.

5. In a beater, a drive wheel having cogs, a pinion adapted to engage with said cogs, a second pinion adapted to intermesh with said first named pinion, but so constructed as to escape engagement with the cogs of the drive wheel, said pinions being so disposed as to lie in the same plane which is a plane substantially parallel with the plane of the cog surface of the driving wheel.

6. In a beater, a driving wheel having cogs extending around approximately one-half thereof and a plain surface extending around the balance thereof, said plain surface being elevated or thickened, an integral sleeve extending from said driving wheel said sleeve being provided with an irregular end surface adapted to engage a corresponding sleeve.

EARNEST W. LADD.

Witnesses:
JAMES N. CATLOW,
EVA G. MEHRINGER.